(12) United States Patent
Fraisse

(10) Patent No.: US 10,445,456 B1
(45) Date of Patent: Oct. 15, 2019

(54) INCREMENTAL ROUTING FOR CIRCUIT DESIGNS USING A SAT ROUTER

(71) Applicant: Xilinx, Inc., San Jose, CA (US)

(72) Inventor: Henri Fraisse, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 50 days.

(21) Appl. No.: 15/623,302

(22) Filed: Jun. 14, 2017

(51) Int. Cl.
*G06F 17/50* (2006.01)

(52) U.S. Cl.
CPC ........ *G06F 17/5077* (2013.01); *G06F 17/504* (2013.01); *G06F 17/5031* (2013.01); *G06F 17/5054* (2013.01); *G06F 17/5068* (2013.01); *G06F 17/5081* (2013.01); *G06F 2217/06* (2013.01); *G06F 2217/84* (2013.01)

(58) Field of Classification Search
None
See application file for complete search history.

(56) References Cited

U.S. PATENT DOCUMENTS

| | | | |
|---|---|---|---|
| 5,648,913 A | 7/1997 | Bennett et al. | |
| 5,659,484 A | 8/1997 | Bennett et al. | |
| 5,971,595 A | 10/1999 | Grant et al. | |
| 6,086,629 A | 7/2000 | McGettigan et al. | |
| 6,292,916 B1 * | 9/2001 | Abramovici | G01R 31/3185 714/736 |
| 6,308,309 B1 | 10/2001 | Gan et al. | |
| 6,415,430 B1 * | 7/2002 | Ashar | G06F 17/504 703/15 |
| 6,877,040 B1 * | 4/2005 | Nam | G06F 17/5054 709/238 |
| 7,073,149 B2 | 7/2006 | Knol et al. | |
| 7,185,309 B1 | 2/2007 | Kulkarni et al. | |
| 7,194,710 B2 * | 3/2007 | Prasad | G06F 17/504 716/106 |
| 7,251,804 B1 | 7/2007 | Trimberger | |
| 7,281,093 B1 | 10/2007 | Kulkarni et al. | |
| 7,360,196 B1 * | 4/2008 | Perry | G06F 17/5054 716/103 |
| 7,367,007 B1 | 4/2008 | Sundararajan et al. | |
| 7,386,828 B1 * | 6/2008 | Safarpour | G06F 17/5027 716/105 |
| 7,500,060 B1 | 3/2009 | Anderson et al. | |
| 7,574,680 B1 | 8/2009 | Kulkarni et al. | |

(Continued)

OTHER PUBLICATIONS

R. G. Wood et al., "FPGA Routing and Routability Estimation via Boolean Satisfiability," IEEE Trans. on VLSI Systems, vol. 6, No. 2, Jun. 1998, pp. 222-231. (Year: 1998).*

(Continued)

*Primary Examiner* — Leigh M Garbowski
(74) *Attorney, Agent, or Firm* — Kevin T. Cuenot

(57) ABSTRACT

Routing a circuit design for implementation within an integrated circuit can include determining a set of candidate paths from available paths of the integrated circuit for connecting source-sink pairs of the circuit design, wherein the set of candidate paths is initially a subset of the available paths, and generating, using a processor, an expression having a plurality of variables expressed as a conjunction of routing constraints representing legal routes of the source-sink pairs using only the candidate paths. A routing result for the circuit design can be determined by initiating execution of a SAT solver on the expression using the processor.

20 Claims, 6 Drawing Sheets

(56) References Cited

U.S. PATENT DOCUMENTS

| | | | |
|---|---|---|---|
| 7,650,248 B1 | 1/2010 | Baxter | |
| 7,831,943 B1* | 11/2010 | Das | G06F 17/5054 |
| | | | 716/106 |
| 7,904,867 B2* | 3/2011 | Burch | G06F 17/5077 |
| | | | 716/130 |
| 8,006,021 B1 | 8/2011 | Li et al. | |
| 8,020,163 B2 | 9/2011 | Nollet et al. | |
| 8,104,011 B1 | 1/2012 | Sundararajan et al. | |
| 8,136,077 B2* | 3/2012 | McMurchie | G06F 17/5054 |
| | | | 716/108 |
| 9,465,904 B2* | 10/2016 | Sale | G06F 17/5077 |
| 2018/0101624 A1* | 4/2018 | Dhar | G06F 17/5031 |

OTHER PUBLICATIONS

G.-J. Nam et al., "A New FPGA Detailed Routing Approach via Search-Based Boolean Satisfiability," IEEE Trans on Computer-Aided Design of Integrated Circuits and Systems, vol. 21, No. 6, Jun. 2002, pp. 674-684. (Year: 2002).*

G.-J. Nam et al., "Hybrid Routing for PFGAs by Integrating Boolean Satisfiability with Geometric Search," Conference Paper in Lecture Notes in Computer Science, Sep. 2002, pp. 360-369. (Year: 2002).*

Y. Oh et al., "AMUSE: A Minimally-Unsatisfiable Subformula Extractor," 2004 ACM DAC'04, pp. 518-523. (Year: 2004).*

G.-J. Nam et al., "A Comparative Study of Two Boolean Formulations of FPGA Routing Constraints," IEEE Trans. on Computers, vol. 53, No. 6, Jun. 2004, pp. 688-696. (Year: 2004).*

N. Ryzhenko et al., "Standard Cell Routing via Boolean Satisfiability," 2012 ACM DAC, pp. 603-612. (Year: 2012).*

H. Fraisse et al., "Boolean Satisfiability-Based Routing and Its Application to Xilinx UltraScale Clock Network," 2016 ACM FPGA '16 , pp. 74-79. (Year: 2016).*

U.S. Appl. No. 15/640,009, filed Jun. 30, 201, Suthar, V. et al., "Placement, Routing, and Deadloc Removal for Network-On-Chip Using Integer Linear Programming", Xilinx, Inc., San Jose, CA USA.

U.S. Appl. No. 15/639,485, filed Jun. 30, 2017, Swarbrick I.A. et al., "Routing Circuit Designs for Implementation Using a Programmable Network on Chip," Xilinx, Inc., San Jose, CA USA.

Cho, M. et al., "BoxRouter: A New Global Router Based on Box Expansion and Progressive ILP," In ACM Proc. of DAC 2006, Jul. 24-28, 2006, pp. 373-378.

Wood, R. et al., "FPGA Routing and Routability Estimation via Boolean Satisfiability," IEEE Transactions on Very Large Scale Integration (VLSI) Systems, vol. 6, No. 2, Jun. 1998, 10 pg.

Nam, G. et al., "A New FPGA Detailed Routing Approach via Search-Based Boolean Satisfiability," IEEE Transactions on Computer-Aided Design of lntergrated Circuits and Systems, vol. 21, No. 6, Jun. 2002, 11 pg.

McMurchie, L. et al., "PathFinder: A Negotiation-Based Performance-Driven Router for FPGAs," In Proc. ACM/IEEE Int'l. Sym. Field Programmable Gate Arrays, Feb. 1995, 7 pg.

Nam, G. et al., "A Comparative Study of Two Boolean Formulations of FPGA Detailed Routing Constraints," IEEE Trans. on Computers, vol. 53, No. 6, Jun. 2004, 9 pg.

Fraisse, H. et al., "Boolean Satisfiability-Based Routing and Its Applicaiton to Xilinx UltraScale Clock Network," In Proc. of 2016 ACM/SIGDA Int'l. Sym. on Fieldl-Programmable Gate Arrays, Feb. 2016, 6 pg.

Hu, J. et al., "Sidewinder: A Scalable ILP-Based Router," In Proc. of 2008 Int'l. Workshop on System Level Interconnect Prediction, Apr. 5-8, 2008, 7 pg.

Dally, W.J. et al., "Deadlock-Free Message Routing in Multiprocessor Interconnection Networks," In IEEE Trans. on Computers, vol. 36, No. 5, May 1987, pp. 547-553.

* cited by examiner

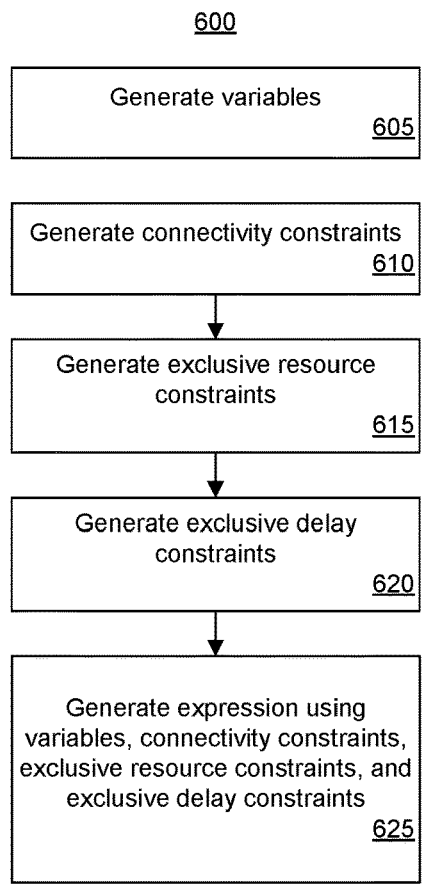
FIG. 6
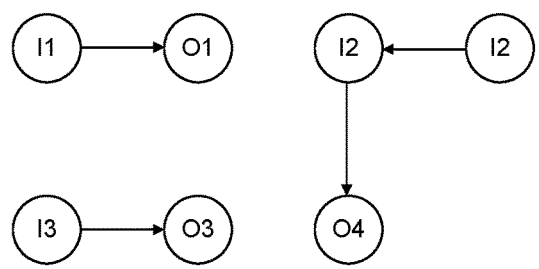

INCREMENTAL ROUTING FOR CIRCUIT DESIGNS USING A SAT ROUTER

FIELD OF THE INVENTION

This disclosure relates to routing circuit designs for implementation in integrated circuits and, more particularly, to an incremental routing process that utilizes a satisfiability (SAT) router.

BACKGROUND

Designers of digital circuits rely upon computer aided techniques. Standard hardware description languages (HDLs) such as Verilog and VHDL have been developed that are used to describe digital circuits. HDLs allow a designer to create a definition of a digital circuit design at the gate level, the register transfer level (RTL), or the behavioral level using abstract data types.

The design process typically entails writing a circuit design as HDL code and subsequently compiling the HDL code as part of a process called "synthesis." The compiler generates an RTL netlist. The RTL netlist may be technology independent in that the netlist is independent of a particular technology and/or architecture of a specific vendor's integrated circuit.

Synthesis may also include mapping where low level logic gates of the RTL netlist are correlated, or matched, to the various types of circuit blocks that are actually available in a particular technology and/or architecture of a specific vendor's integrated circuit (the "target IC"). For example, a plurality of logic gates of the technology independent RTL netlist may be mapped to a single lookup table (LUT). The mapped circuit design specifies the same functionality as the low-level design implementation, albeit in terms of the particular circuit blocks available on the target IC as opposed to low-level logic gates.

The circuit design may then be placed. Placement is the process of assigning elements of the synthesized circuit design to particular instances of circuit blocks and/or resources having specific locations on the target IC. Once placed, a circuit element of the circuit design has a specific location on the target IC as opposed to only being assigned to a particular type of circuit block and/or resource as is the case after mapping and prior to placement. The location of a circuit element of a circuit design, once placed, is the location on the target IC of the instance of the circuit block and/or resource to which the circuit element is assigned.

Routing is the process of selecting particular routing resources such as wires, programmable interconnection points (PIPs), PIP settings, and/or other interconnect circuitry to electrically couple the various circuit blocks of the target IC after placement. As part of the routing process, routing resources, e.g., routing circuitry, is assigned to each net of the circuit design to connect sources and sinks. While the resulting circuit design may be further optimized, the routed circuit design may be loaded and/or implemented within an IC.

SUMMARY

One or more embodiments are directed to methods of routing a circuit design for implementation within an IC. In one aspect, a method can include determining a set of candidate paths from available paths of the IC for connecting source-sink pairs of the circuit design, wherein the set of candidate paths is initially a subset of the available paths, generating, using a processor, an expression having a plurality of variables expressed as a conjunction of routing constraints representing legal routes of the source-sink pairs using only the candidate paths, and determining a routing result for the circuit design by initiating execution of a SAT solver on the expression using the processor.

One or more embodiments are directed to systems for routing a circuit design for implementation within an IC. In one aspect, a system includes a processor configured to initiate executable operations. The executable operations include determining a set of candidate paths from available paths of the IC for connecting source-sink pairs of the circuit design, wherein the set of candidate paths is initially a subset of the available paths, generating an expression having a plurality of variables expressed as a conjunction of routing constraints representing legal routes of the source-sink pairs using only the candidate paths, and determining a routing result for the circuit design by initiating execution of a SAT solver on the expression.

One or more embodiments are directed to computer program products for routing a circuit design for implementation within an IC. In one aspect, a computer program product includes a computer readable storage medium having program code stored thereon. The program code is executable by a processor to perform a method including determining a set of candidate paths from available paths of the IC for connecting source-sink pairs of the circuit design, wherein the set of candidate paths is initially a subset of the available paths, generating an expression having a plurality of variables expressed as a conjunction of routing constraints representing legal routes of the source-sink pairs using only the candidate paths, and determining a routing result for the circuit design by initiating execution of a SAT solver on the expression.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 6 illustrates a method of generating a Boolean formula using a timing-driven encoding process.

DETAILED DESCRIPTION OF THE DRAWINGS

Figure 1:
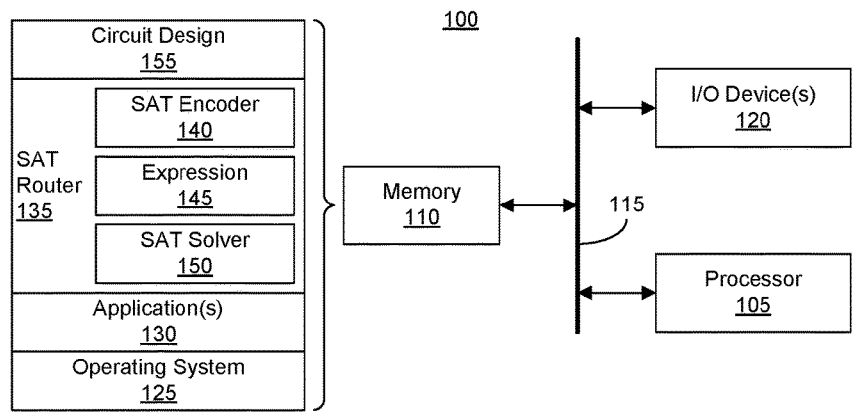
FIG. 1 illustrates an example architecture for a data processing system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to routing circuit designs for implementation in integrated circuits and, more particularly, to an incremental routing process that utilizes a SAT router. A SAT router refers to an engine that is capable of receiving, as input, a routing problem and either returning a legal route for the routing problem or proving that no legal route exists for the routing problem. Example embodiments described within this disclosure provide methods, systems, and computer program products that efficiently route a circuit design with a SAT router using an incremental approach. The example embodiments described herein are able to find a solution to a routing problem for a large circuit design or network such as an entire programmable IC. Further, the example embodiments described herein are able to find a solution or, in the alternative, determine that no solution exists for a routing problem, in less time than is the case with conventional SAT routers.

A conventional SAT router generates an expression, e.g., a Boolean formula, that encodes the routing problem in its entirety. The conventional SAT router then attempts to find a solution for the routing problem using a SAT solver. If the expression is too complicated, the SAT solver is unable to find a solution to the routing problem in a reasonable amount of time even if a solution does exist. As such, the conventional SAT router is unable to scale up operation to route large circuit designs and/or networks. As an illustrative example, a conventional SAT router is unable to route an entire programmable IC such as a field programmable gate array (FPGA).

One or more embodiments described within this disclosure are directed to incremental routing using a SAT router. Rather than encoding the entire routing problem for a circuit design in its entirety, a plurality of expressions are generated that encode the routing problem in a limited or restricted manner. Any variable assignment that satisfies one of the expressions of this limited encoding can be translated into a legal route for the circuit design. Despite applying these limitations, at least initially, a SAT router implemented as described herein is capable of utilizing an exhaustive approach to explore the entire search space when solving a given routing problem such as routing a circuit design or a portion of a circuit design.

In an example, the SAT router described herein is capable of limiting the number of paths that may be used to route a circuit design to a set of candidate paths. Because a SAT router performs an exhaustive search that explores the entire search space, initially limiting the paths that are available for determining a routing solution works to reduce runtime of the SAT router. In cases where the SAT router is unable to find a solution to the routing problem, the exploration space, e.g., the set of candidate paths available for routing, is expanded and the SAT router is executed again using the expanded exploration space. The process may continue where the exploration space is expanded for subsequent iterations, as described herein, until the SAT router finds a solution or proves that the routing problem has no legal solution.

In one or more embodiments, a SAT router is capable of using a timing model. For example, the SAT router uses a timing-driven encoding process that incorporates timing into the variables that are used and the resulting expression. In an aspect, the timing model approach described herein may be used in combination with the incremental process described above.

In one or more embodiments, a SAT router is capable of processing networks that include cycles. Conventional SAT routers are unable to process networks that include cycles. The inventive arrangements described herein are also capable of achieving an improved Quality of Result (QOR) over conventional SAT routers. For example, a SAT router as described herein is capable of generating a routing solution with improved delay characteristics and/or reduced routing resource utilization for the particular IC in which the circuit design is to be implemented (hereafter the "target IC") compared to a conventional SAT router.

The example embodiments described herein may be adapted to operate on a variety of different types and/or sizes of networks. These networks may include a large amount of congestion and, as noted, may include cycles. In another aspect, the example embodiments are adapted to process medium size networks that may contain cycles. As an illustrative example, a SAT router, as described herein, is capable of operating on, and processing, network-on-chip (NOC) type networks, math-engine arrays, and so forth.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example data processing system (system) 100. System 100 includes one or more processors 105 coupled to memory 110 through interface circuitry 115. System 100 stores program code within memory 110. Processor 105 executes the program code accessed from memory 110 via interface circuitry 115. In one aspect, system 100 is implemented as a computer or other data processing system that is suitable for storing and/or executing program code. It should be appreciated, however, that system 100 can be implemented in the form of any system including a processor and memory that is capable of performing the functions described within this disclosure.

Memory 110 includes one or more physical memory devices such as, for example, a local memory and one or more bulk storage devices. Examples of local memory include, but are not limited to, RAM(s) or other non-persistent memory device(s) generally used during actual execution of the program code. Examples of a bulk storage device include, but are not limited to, a hard disk drive (HDD), a solid state drive (SSD), or other persistent data storage device. System 100 may also include one or more cache memories (not shown) that provide temporary storage of at least some program code in order to reduce the number of times program code must be retrieved from a bulk storage device during execution.

Examples of interface circuitry 115 include, but are not limited to, an input/output (I/O) subsystem, an I/O interface, a bus system, and a memory interface. For example, interface circuitry 115 may be one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

System 100 may optionally include one or more input/output (I/O) devices 120 coupled to interface circuitry 115. Examples of I/O devices 120 include, but are not limited to, a keyboard, a display device, a pointing device, a network adapter, one or more communication ports, etc. The I/O devices may be coupled to system 100 directly, through intervening I/O controllers, and so forth. A network adapter enables system 100 to become coupled to other systems, computer systems, remote printers, and/or remote storage devices through intervening private or public networks. Modems, cable modems, Ethernet cards, and wireless transceivers are examples of different types of network adapters that may be used with system 100.

Memory 110 stores program code that is executable by processor 105. The program code may generally include program modules, routines, programs, objects, components, logic, data structures, and so on. For purposes of illustration, memory 110 is shown to store an operating system 125 and one or more application(s) 130. In one or more embodiments, application(s) 130 include an electronic design automation (EDA) application. The EDA application is capable of performing operations such as synthesis, placement, routing, bitstream generation, and so forth on a circuit design 155. Circuit design 155, for example, may be specified using a hardware description language (HDL), as a netlist, or as another type of data structure.

In one aspect, memory 110 stores a SAT router 135. SAT router 135 is executable by processor 105. SAT router 135 is capable of determining whether a solution exists for a routing problem such as determining routes for (e.g., routing) circuit design 155. While SAT router 135 is illustrated as an independent application, in another aspect, SAT router 135 may be integrated with an application 130, e.g., an EDA application. In an embodiment, SAT router 135 includes a SAT encoder 140 that is capable of encoding the routing problem of circuit design 155 into an expression 145. SAT router 135 further may include a SAT solver 150.

In one or more embodiments, expression 145 is a Boolean formula. A Boolean variable is a variable that can take on the value of either true or false. A Boolean formula is constructed from Boolean variables and various Boolean operators. Examples of Boolean operators include, but are not limited to, the unary operator NOT (negation, also denoted by an overline such as $\bar{t}$), and the binary operators AND (conjunction, also denoted by $\wedge$), OR (disjunction, also denoted by $\vee$), and IMP (implication, also denoted by =>). As an illustrative example, $(x_1 \vee \bar{x_2}) \Rightarrow (x_3 \wedge (\overline{x_1 \vee x_4}))$ is an example of a Boolean formula over the Boolean variables $\{x_1, x_2, x_3, x_4\}$.

A literal refers to an atomic Boolean formula which is either a Boolean variable or the negation of the Boolean variable. For example, $x_i$ and $\bar{x_i}$ are literals. A clause is a Boolean formula which is a disjunction of literals. For example, $(x_1 \vee \bar{x_2} \vee x_3)$ is a clause containing 3 literals.

A Conjunctive Normal Form (CNF) is a Boolean formula which is a conjunction of clauses. For example, $(x_1 \vee \bar{x_2} \vee x_3) \wedge (\bar{x_1} \vee x_4) \wedge \bar{x_4}$ is a CNF with 3 clauses. In practice, CNFs may be expressed as a list of clauses. For example, the CNF of $(x_1 \vee \bar{x_2} \vee x_3) \wedge (\bar{x_1} \vee x_4) \wedge \bar{x_4}$ can be expressed as:

$$x_1 \vee \bar{x_2} \vee x_3$$

$$\bar{x_1} \vee x_4$$

$$\bar{x_4}$$

SAT encoder 140, as executed by system 100, is capable of generating expression 145. Expression 145 includes one or more constraints and/or variables. In one aspect, in the case where expression 145 is a Boolean formula, the Boolean formula is a CNF. Expression 145 defines the problem of routing circuit design 155 to be solved by SAT router 135. In one or more embodiments, SAT encoder 140 performs a selected SAT encoding process to generate expression 145 and/or assumptions defined as literals.

In general, the constraints are, or include, routing constraints or a conjunction of routing constraints, that represent legal routes of source-sink pairs to be routed using only a set of candidate paths. Examples of different types of constraints include, but are not limited to, problem connectivity constraints, network connectivity constraints, and exclusive constraints. Problem connectivity constraints specify the existence of a conductive path between each pair of a source node (e.g., a source circuit) and a sink node (e.g., a sink circuit) referred to herein as a "source-sink pair" or as a (source, sink). The system is capable of defining one problem connectivity constraint for each source-sink pair. Network connectivity constraints define how signals are propagated within the network. Network connectivity constraints are generally inductive, involving a selected node and the predecessor node (or predecessor nodes) for the selected node. Network connectivity constraints are required to make sure that each signal is properly routed to the destination. Exclusivity constraints guarantee that two different signals cannot use the same resources.

In one or more embodiments, SAT encoder 140 creates a variable for each source-sink pair of the routing problem. The variables may be Boolean variables. The value of the variable encodes the existence of a path between the source and the sink in the routing solution. The source-sink variables are used as assumptions that are passed to SAT solver 150. Further aspects of SAT encoding processes are discussed in greater detail below with reference to FIGS. 3, 4, and 6. A system, e.g., system 100 of FIG. 1, is capable of defining variables and the corresponding semantic for each variable.

In one or more embodiments, SAT solver 150 is implemented as an engine capable of either finding a variable assignment that satisfies expression 145 and any assumptions passed thereto or proving that no variable assignment exists that satisfies expression 145 and any assumptions. SAT solver 150 utilizes an exhaustive approach to explore the entire search space. Thus, SAT router 135 is capable of determining a routing solution for circuit design 155 or determining that a solution does not exist.

In the case of a Boolean formula, a variable assignment refers to the association of a Boolean value such as "true" or "false" to all the Boolean variables. Given a Boolean formula f and a variable assignment, a SAT router can determine a Boolean value for f by traversing the formula f bottom-up and attaching a Boolean value to all the intermediate nodes of the formula f. A Boolean formula f is said to be "satisfiable" if there exists at least one assignment of the variables of f that evaluates to "true" for the formula overall. In particular, a CNF is satisfiable if and only if there is an assignment of variables of the CFN for which each clause contains at least one literal with the value true. For example, the variable assignment of Example 1 satisfies the CNF $(x_1 \vee \overline{x_2} \vee x_3) \wedge (\overline{x_1} \vee x_4) \wedge \overline{x_4}$ because the literal $x_3$ has the value "true" in the first clause, the literal $\overline{x_1}$ has the value "true" in the second clause, and the literal $\overline{x_4}$ has the value "true" in the third clause.

Example 1

$x_1$ = false
$x_2$ = true
$x_3$ = true
$x_4$ = false

In contrast, the variable assignment illustrated in Example 2 does not satisfy the CNF of $(x_1 \vee \overline{x_2} \vee x_3) \wedge (\overline{x_1} \vee x_4) \wedge \overline{x_4}$ since none of the literals of the clause $(\overline{x_1} \vee x_4)$ have the value "true."

Example 2

$x_1$ = true
$x_2$ = true
$x_3$ = true
$x_4$ = false

In one or more embodiments, SAT solver 150 is an incremental SAT solver that uses an incremental mode. In the incremental mode, SAT solver 150 receives inputs in the form of expression 145, e.g., a CNF, and a set of one or more assumptions. The assumptions are literals assumed to have a true value. When called under a set of assumptions, SAT solver 150 creates an extended expression, e.g., an extended Boolean formula, made of the conjunction of expression 145 and the literals (e.g., the assumptions). SAT solver 150 is called to find a solution for the extended expression. Accordingly, SAT solver 150 either returns a solution that satisfies the extended expression or returns a minimal set of assumptions that, taken together, make expression 145 unsatisfiable. When returning a set of assumptions, SAT solver 150 is capable of indicating that at least one of the returned assumptions needs to be removed in order to make the extended expression satisfiable. The returned assumptions may be used as a guide to build another more appropriate extended expression.

In one or more embodiments, SAT router 135 reduces the complexity inherent in conventional SAT routers and the expressions used by conventional SAT solvers by generating a set of candidate paths from the available paths of circuit design 155. The available paths of circuit design 155 represent the entirety of the paths of a target IC that may be used for routing circuit design 155. SAT router 135 is capable of extracting, or determining, a set of candidate paths from the available paths for purposes of reducing or limiting the search space utilized by SAT solver 150. At least initially, the set of candidate paths is a subset of the available paths, e.g., has fewer paths than the available paths. The set of candidate paths, as opposed to the available paths, are used to route circuit design 155. The set of candidate paths may be increased or extended for further execution(s) of SAT router 135 as described herein as part of an incremental routing approach.

Each assumption returned by SAT solver 150 corresponds to a sink of the routing problem that SAT router 135 marks or qualifies as a "critical" sink thereafter. SAT router 135 is capable of selectively increasing the set of candidate paths for the critical sinks. By selectively increasing the set of candidate paths, SAT router 135 is able to limit the size of the next expression while also allowing more paths to be used for routing the source-sink pairs with "critical" sinks.

In one aspect, operating system 125 and application(s) 130 (and/or SAT router 135), being implemented in the form of executable program code, are executed by system 100 and, more particularly, by processor 105, to perform the operations described within this disclosure. As such, operating system 125, application(s) 130, and SAT router 135 may be considered an integrated part of system 100. Any data used, generated, and/or operated upon by system 100 are functional data structures that impart functionality when employed as part of system 100.

System 100 may include fewer components than shown or additional components not illustrated in FIG. 1 depending upon the particular type of device that is implemented. In addition, the particular operating system and/or application(s) included may vary according to device type as may the types of network adapter(s) included. Further, one or more of the illustrative components may be incorporated into, or otherwise form a portion of, another component. For example, a processor may include at least some memory.

Figure 2:
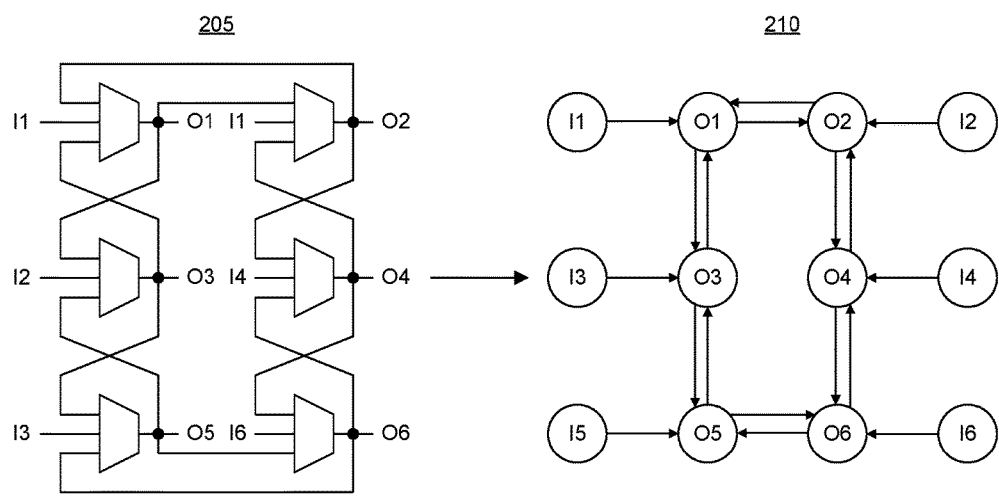
FIG. 2 illustrates an example of a data structure generated to represent circuitry for purposes of routing.

FIG. 2 illustrates an example of a data structure generated to represent circuitry for purposes of routing. Circuitry 205 is formed of a plurality of multiplexers and wires, e.g., collectively "routing resources," configured to pass selected signals to establish connections between wires. Circuitry 205 includes inputs I1,I2,I3,I4,I5, and I6; and outputs O1,O2,O3,O4,O5, and O6. In an embodiment, circuitry 205 represents routing resources of a programmable IC such as an FPGA that has not been configured (e.g., a programmable IC in which a circuit design has not yet been loaded). In an embodiment, circuitry 205 is a network-on-chip. A review of circuitry 205 reveals multiple cycles. The term "cycle" refers to a path in a circuit design or programmatic representation thereof from a circuit element that loops back to itself (e.g., to the same circuit element).

Circuitry 205 is expressed as a data structure using an HDL, a netlist, etc. In an aspect, the system is capable of operating on the data structure specifying circuitry 205 in order to generate data structure 210. Data structure 210 specifies a graph representing circuitry 205 and the available paths linking circuit elements using directional arrows. Data structure 210 still includes the cycles that existed in circuitry 205. In accordance with the example embodiments described herein, SAT router 135 is capable of determining routing solutions for routing problems despite the inclusion of cycles within circuitry 205.

Figure 3:
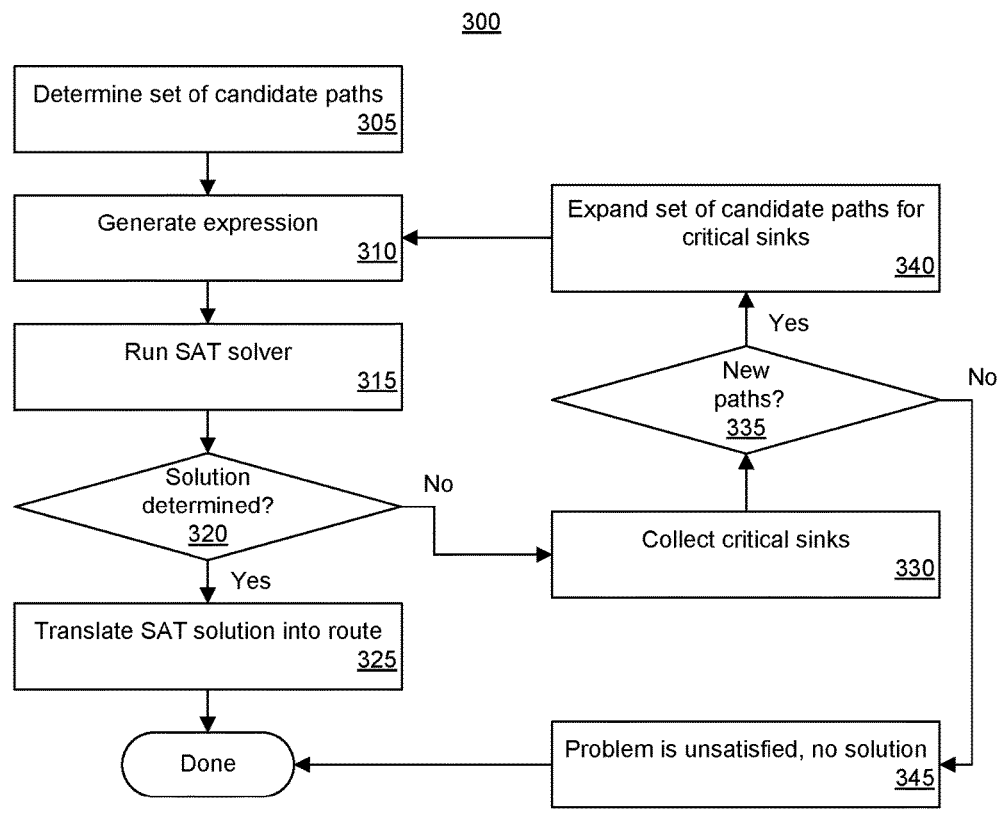
FIG. 3 illustrates a method of routing a circuit design with a SAT router using an incremental approach.

FIG. 3 illustrates a method 300 of routing a circuit design with a SAT router using an incremental approach. Method 300 utilizes the incremental approach to initially limit the search space used by the SAT router and subsequently expand the search space over time as needed. In an embodiment, method 300 is performed by a system such as system 100 of FIG. 1 or another system similar thereto. The system, as discussed, executes a SAT router to determine a routing for a given circuit design. In general, FIG. 3 illustrates an example embodiment where the SAT router generates multiple expressions, where each expression represents the set of legal routes that use only paths from a set of candidate paths.

Method 300 may begin in block 305 where the system determines a set of candidate paths. For example, the target IC has a large number of available paths formed of routing resources such as wires, programmable interconnect points, multiplexers, and/or switches. The totality of these paths are referred to as the available paths for the target IC. To increase the execution speed of the SAT router, the system is capable of reducing the size of the search space used for exploration during execution of the SAT router. Thus, the system is capable of extracting, or determining, a set of candidate paths from the available paths for the target IC. As discussed, the set of candidate paths, at least initially, is a subset of the available paths. The set of candidate paths are utilized during execution of the SAT router.

In an aspect, the system is capable of determining the candidate paths by selecting the shortest candidate path or paths connecting the source-sink pairs of the circuit design that are to be routed. For example, for each source-sink pair to be routed, the system is capable of selecting one or more or all shortest paths connecting the source and the sink. The system adds the selected paths to the set of candidate paths. In some cases, the number of shortest paths between a source and a sink may be large. The system is capable of representing these paths in a compact form by using one variable for each node located on one of the shortest paths.

In an aspect, the variable may be a Boolean variable. As an illustrative example and referring to FIG. 8, it can be shown that there are 495 shortest paths between S and T, with each shortest path containing 12 edges. These 495 shortest paths can be represented by the SAT encoder using 45 Boolean variables (one Boolean variable per node) using a timing-driven encoding as described herein in greater detail below.

Thus, at least initially, the SAT router is restricted to utilize only the shortest paths connecting sources to sinks. If there is no solution found on the set of candidate paths, the set of candidate paths is increased and another run of the SAT solver is started. Using an incremental flow as described results in reduced runtime (e.g., faster execution speed) for the system.

In block 310, the system generates an expression. In an aspect, the expression may be a Boolean formula. The Boolean formula can be a CNF. The expression includes variables and operators to represent the set of legal routes on the candidate paths. In the case of a Boolean formula, the variables and operators are Boolean variables and Boolean operators, respectively. In one or more embodiments, different types of SAT encodings may be used. In one example, the system is capable using a path-driven encoding process to generate the expression. In another example, the system is capable of using a timing-driven encoding process to generate the expression. Further details relating to the SAT encoding processes are provided in connection with FIGS. 4, 5, and 6.

In one or more embodiments, the expression is a Boolean formula having a plurality of Boolean variables. The Boolean formula is expressed as a conjunction of routing constraints representing legal routes of the source-sink pairs. Further, the Boolean formula uses only the candidate paths.

In block 315, the system runs the SAT solver on the generated expression. The expression includes, for example, any assumptions expressed as literals. As discussed, the SAT solver attempts to find an assignment of variables in which the expression evaluates to true. During execution of the SAT solver, the paths that may be used to generate a routing for the circuit design are limited to those of the set of candidate paths. The paths of the target IC that are not within the set of candidate paths are not used or considered for purposes of routing the circuit design during the current execution of the SAT solver.

In block 320, the system determines whether a solution to the routing problem is found. For example, the system determines that a solution to the routing problem is found in response to determining an assignment for the variables in which the expression generated in block 310 evaluates to true. The system determines that a solution was not found in response to determining that no assignment for the variables results in the expression generated in block 310 evaluating to true. In response to execution of the SAT solver finding a solution to the routing problem, method 300 continues to block 325. In response to the SAT solver being unable to find a solution to the routing problem, method 300 proceeds to block 330.

In block 325, the system is capable of translating the SAT solution, e.g., the assignment of variables resulting in the expression evaluating to true, into a routing solution for the circuit design. The SAT solution, for example, specifies which nodes of the graph data structure are used to route each of the source-sink pairs. After block 325, method 300 may end.

Continuing with block 330, where a routing solution is not determined, the system collects the critical sinks. When the SAT router proves that a given Boolean formula is not satisfiable, the SAT router is capable of determining a minimal set of sinks, e.g., as returned by the SAT solver. The minimal set of sinks are sinks that the SAT router determines cannot be routed simultaneously using only the current set of candidate paths. These sinks are marked or denoted as "critical" sinks thereafter. A critical sink is a sink of a source-sink pair for which a route is not determined. The variable representing the routing of the source-sink pair, for example, has a value of false for each sink that is not routed.

In block 335, the system determines whether new paths exist. As discussed, the system is capable of expanding the search space in cases where a solution is not found. As applied to routing, expansion of the search space entails expanding the set of candidate paths. In an aspect, the system expands a limited number of the candidate paths in the set.

In an embodiment, the system is capable of expanding the set of candidate paths associated with critical sinks. As discussed, the set of candidate paths created in block 305 initially includes the set of shortest paths, e.g., all shortest paths, for each source-sink pair to be routed. For paths of the set of candidate paths for critical sinks, the system determines whether the paths may be extended. In other words, the system is capable of determining whether one or more paths not yet in the set of candidate paths exist that maybe added to the set of candidate paths for a critical sink. For example, if the existing candidate paths have a length of "N," additional paths may exist with a next incremental length, e.g., a length of N+1, or more that may be added. In response to determining that one or more new paths exist for extending candidate paths as described, method 300 continues to block 340. In response to determining that new paths are not available (e.g., do not exist) for extending candidate paths as described, a stopping condition is met. Accordingly, method 300 proceeds to block 345.

In block 340, the system expands the set of candidate paths for critical sinks using the new paths found in block

335. For example, the system expands the set of candidate paths for critical sinks by creating new variables for the nodes that are on the new added paths. Thus, after block 340, the set of candidate paths is considered to be an "expanded set" or considered to have been "expanded." After block 340, method 300 loops back to block 310 to continue processing. In block 310, for example, the system is capable of extending the expression as described herein.

The system is capable of selectively increasing the set of candidate paths from the sources to the critical sinks. The system is capable of expanding the set of candidate paths without modifying the set of candidate paths between the sources and the other sinks (e.g., non-critical or routed sinks). Further, the set of candidate paths may be expanded by a limited amount, e.g., only adding paths for critical sinks of length N+X, where X is a selected integer value of 1 or more. This selectivity improves the granularity of the search space exploration and the runtime of the SAT router.

In the case where the set of candidate paths between the sources and the critical sinks cannot be extended, it is guaranteed that the routing problem has no solution even if the set of the candidate paths between the sources and other sinks can be extended. The system is capable of utilizing the set of critical sinks to prove that no solution exists in less time than is otherwise the case since not all available paths need to be included in the set of candidate paths.

During the next run of the SAT solver in block 315, the SAT solver uses the expanded search space represented by the subset of candidate paths now including expanded paths as described. For example, the SAT solver is called to operate on each generated expression until a solution is found for the circuit design or until a determination is made that no solution exists. When the SAT solver proves that a given expression is not satisfiable, the SAT solver returns a minimal set of sinks for which the SAT solver has determined cannot be routed simultaneously using only the current set of candidate paths. This minimal set of sinks are noted critical sinks thereafter.

Continuing with block 345, where there are no new paths that may be used to expand the set of candidate paths, the system determines that the routing problem is unsatisfiable and that no solution exists. After block 345, the method ends. In an aspect, in performing block 345, the system is capable of outputting, e.g., storing in a memory, displaying on a display device, etc., the particular constraints and/or variables of the encoding that are not met.

Thus, referring to FIG. 3, in response to the routing result indicating that the expression is not satisfiable, the system is capable of expanding the set of candidate paths, extending the expression using the expanded set of candidate paths, and initiating further execution of the SAT router on the extended expression. The system is capable of expanding the set of candidate paths, extending the expression using the expanded set of candidate paths, and executing the SAT solver on the extended expression in response to each unsatisfiable result.

In an embodiment, the system is capable of expanding the set of candidate paths, extending the expression using the expanded set of candidate paths, and executing the SAT solver on the extended expression in response to each unsatisfiable result until a stopping condition is met. An example of a stopping condition that can be applied by the system in block 320 is determining that the execution time of the current iteration of the SAT solver has exceeded a threshold amount of time.

The system is also capable of applying a stopping condition as described above relating to execution time in block 335. In another example, the system can apply a stopping condition in block 335 that limits the number of iterations of calling the SAT solver. The stopping conditions described herein are provided for purposes of illustration and, as such, as not intended as limitations of the embodiments described herein. As noted, the stopping conditions are optionally applied.

Figure 4:
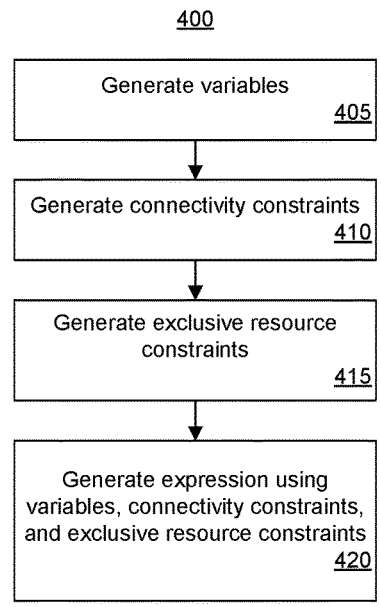
FIG. 4 illustrates a method generating a Boolean formula using a path-driven encoding process.

FIG. 4 illustrates a method 400 of generating an expression using a path-driven encoding process. In an embodiment, block 310 of FIG. 3 is implemented using method 400. The path-driven encoding process generates a separate set of variables for each source-sink pair. In the case where the expression is a Boolean expression, the variables are Boolean variables. Within the variables, the system encodes the existence of a unique path between the source and sink. This unique path constraint within the variables ensures that cycles are avoided in any solution that is achieved. If a loop exists in a path, for example, an infinite number of paths may be created by duplicating the loop an arbitrary number of times within the path, thereby contradicting the existence of a unique path. This situation is illustrated by path B in FIG. 5 following FIG. 4.

Accordingly, in block 405, the system generates variables. As noted, the path-driven encoding process generates a separate set of variables for each source-sink pair. In one aspect, the system generates Boolean variables as $P_{s,t,n}$, where s is a source node, t is a sink node, and n is a current node. For example, the value of $P_{s,t,n}$ encodes the membership of current node n to Path(s,t), which means that $P_{s,t,n}$=true if and only if n∈Path(s,t).

Starting in block 410, the system generates constraints. In the path-driven encoding example of FIG. 4, the system is capable of generating two different types of constraints for the SAT encoding. The constraints generated include connectivity constraints and exclusive resource constraints. In block 415, the system generates connectivity constraints. Connectivity constraints specify that if a node n different from source node s and sink node t belongs to a Path(s,t), then (1) there exists a unique fan-in node of n belonging to Path(s,t); and (2) there exists a unique fan-out node of n belonging to Path(s,t). In effect, node n has a single fan-in node and a single fan-out node. In block 420, the system generates exclusive resource constraints. Exclusive resource constraints ensure that each node is not driven by more than one source. For example, if a node n belongs to Path($s_1$, $t_1$) and also to Path($s_2$, $t_2$), then $s_1$=$s_2$.

In block 425, the system generates the expression using the variables, the connectivity constraints, and the exclusive resource constraints.

Table 1 illustrates the effect on runtime and resource utilization that may be achieved using the example embodiments described herein. Table 1 compares operation of a conventional SAT router with an incremental SAT router adapted to operate as generally described in connection with FIG. 3 using a path-driven encoding process as described in connection with FIG. 4. Both SAT routers operated on a sample of 100 randomly generated test cases with low levels of congestion for a network that included 64 tiles (e.g., programmable circuit blocks) and 1,536 multiplexers. Table 1 illustrates that the incremental SAT router, on average, generated a routing solution with a significant reduction in runtime compared to the conventional SAT router. Further, on average, the routing solutions generated by the incremental SAT router utilized fewer routing resources of the target IC.

TABLE 1

| Flow (Low Congestion) | Average Runtime | Average Resource Utilization |
|---|---|---|
| Conventional SAT Router | 248 seconds | 46.9% |
| SAT Router using Incremental Approach and Path-Driven Encoding Process | 0.84 seconds | 30.9% |

The path-driven encoding process of FIG. 4, while preventing cycles, does not incorporate a timing element. In another embodiment, the system is capable of using a timing-driven encoding. The timing-driven encoding utilizes a delay model where edges of a graph data structure are annotated with delay information. For purposes of illustration, the delay of a path between two nodes may be considered equal to the sum of the delays of the edges of the path. In an aspect, a unit delay of 1 is used for every edge, though more detailed delay estimates may be used in the alternative.

In using a delay model, the system is capable of incorporating delays into the variables that are generated. The delay enhanced variables are used to enforce the constraint that a signal is always propagated from a source to a node with a unique delay. By enforcing this constraint, the system is able to prevent cycles from occurring in the routing solutions.

Figure 5:
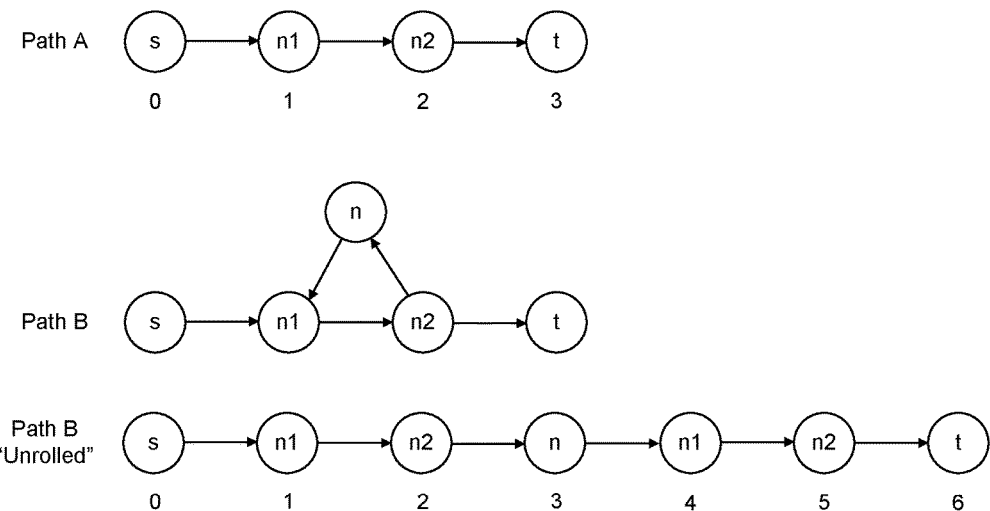
FIG. 5 illustrates a graph showing two different paths from source to a sink.

FIG. 5 illustrates a graph showing two different paths from source s to sink t. Path A does not contain the same node more than one time. The delays are illustrated beneath each node. In this example, delays are unit delays where each node has a delay of 1. Path B, unlike path A, does visit the same node more than one time. Path B is shown in an "unrolled" state to better illustrate the delays associated with the nodes. For example, path B traverses through node n1 twice and traverses through node n1 twice. Since any signal traversing through node n1 two times must have a strictly higher delay for the second traversal of node n1 than the first traversal, node n1 is associated with two different delays in path B. In the timing-driven encoding, this condition is prevented by enforcing a unique delay for each signal and each node to prevent cycles from occurring in the routing solution.

FIG. 6 illustrates a method 600 of generating an expression using a timing-driven encoding process. In an embodiment, block 310 of FIG. 3 is implemented using method 600. The timing-driven encoding utilizes the delay model described above where edges of the graph data structure are annotated with delays and unique delays for signals and edges are enforced. The timing-driven encoding process further utilizes the concept of routing trees discussed in greater detail below, where a routing tree connects a source node to the sink nodes corresponding to the source node in the routing solution.

In block 605, the system generates variables. In the timing-driven encoding process, the system is capable of creating a separate set of variables for each source of the problem to encode trees that connect sources s to the corresponding sinks in the routing solution. In the case where the expression is a Boolean expression, the variables are Boolean variables. In one aspect, each Boolean variable corresponds to a triple (s,n,d) where s is a source node, n is a node, and d represents the delay between node s and node n. The system is capable of preventing cycles in the routing solution by enforcing a unique delay between two nodes. The timing-driven encoding specifies, that a given routing tree s, specified as Tree(s), connects a source node s to a sink node in the routing solution. Further, the timing-driven encoding specifies the delay from source s to node n (represented as delay(s,n)) in the routing solution for n∈ Tree(s).

In an aspect, the system formulates the Boolean variables in the timing-driven encoding process as $D_{s,n,d}$ where s is a source node, n is the current node, and d is the delay from node s to node n. The value of $D_{s,n,d}$ encodes the membership of node n into Tree(s) with the additional constraint that Delay(s,n)=d.

In the timing-driven encoding process of FIG. 6, the system is capable of generating three different types of constraints. The constraints generated include connectivity constraints, exclusive resource constraints, and exclusive delay constraints. Accordingly, in block 610, the system generates connectivity constraints. The connectivity constraints ensure that if a node n that is different from node s belongs to Tree(s), e.g., the tree including node s, then, there exists a node m in Tree(s) and an edge e from node m to node n such that Delay(s,n)=Delay(s,m)+delay(e).

In block 615, the system generates exclusive resource constraints. As was the case with the exclusive resource constraints in the path-driven encoding process, the exclusive resource constraints for the timing-driven encoding process ensure that each node is not driven by more than one source. The formulation for the exclusive resource constraints in the timing-driven encoding process differs from the formulation in the path-driven encoding process due to the differences in the formulations of the variables used.

In block 620, the system generates exclusive delay constraints. As discussed above, in the timing-driven encoding process, there is a unique delay between a source node and a given node in the routing solution. The exclusive delay constraints ensure that this condition remains true.

In block 625, the system generates the expression using the variables, connectivity constraints, exclusive resource constraints, and exclusive delay constraints.

Table 2 illustrates the effect on runtime and resource utilization that may be achieved using the example embodiments described herein. Table 2 compares operation of a SAT router using an incremental approach and a path-driven encoding process compared to a SAT router using an incremental approach and a timing-driven encoding process. For example, in both cases illustrated in Table 2, the process illustrated in FIG. 3 is used. In the path-driven encoding example, the encoding described in connection with FIG. 4 is used. In the timing-driven encoding example, the encoding described in connection with FIG. 6 is used.

Both SAT routers operated on a sample of 100 randomly generated test cases with high levels of congestion for a network that included 64 tiles (e.g., programmable circuit blocks) and 1,536 multiplexers. In the high congestion case, a conventional SAT router, e.g., one that does not use the incremental technique illustrated in FIG. 4, is unable to achieve a solution. Table 2 illustrates the increase in speed and further reduction in resource utilization in the target IC that may be achieved using the timing-driven encoding process over the path-driven encoding process.

TABLE 2

| Flow (High Congestion) | Average Runtime | Average Resource Utilization |
|---|---|---|
| SAT Router using Incremental Approach and | 679 seconds | 71.1% |

TABLE 2-continued

| Flow (High Congestion) | Average Runtime | Average Resource Utilization |
|---|---|---|
| Path-Driven Encoding Process | | |
| SAT Router using Incremental Approach and Timing-Driven Encoding Process | 0.88 seconds | 67.6% |

Below is a timing-driven encoding example for a routing problem of R={I1→O1, O5, O6; I2→O4; I3→O3} to be routed using the circuitry illustrated in FIG. 2. As discussed, in the timing-driven encoding process, the system ensures that each signal can reach a node with a unique delay. This constraint excludes paths containing cycles from the solution since such a path would traverse through the same node multiple times thereby producing multiple delays for that node for the same signal. For purposes of illustration, edges are presumed to have a delay of 1.

The system is capable of generating variables as $D_{s,n,d}$, where s is a source node, n is the current node, and d is the delay from node s to node n. The value of $D_{s,n,d}$ encodes the existence of a path between node s and node n of delay d. Table 3 illustrates example Boolean variables generated by the system.

TABLE 3

Boolean Variables

| $D_{I1,O1,1}$ | $D_{I2,O1,2}$ | $D_{I3,O1,2}$ |
| $D_{I1,O2,2}$ | $D_{I2,O2,1}$ | $D_{I3,O2,3}$ |
| $D_{I1,O3,2}$ | $D_{I2,O3,3}$ | $D_{I3,O3,1}$ |
| $D_{I1,O4,3}$ | $D_{I2,O4,2}$ | $D_{I3,O4,4}$ |
| $D_{I1,O5,3}$ | $D_{I2,O5,4}$ | $D_{I3,O5,2}$ |
| $D_{I1,O6,4}$ | $D_{I2,O6,3}$ | $D_{I3,O6,3}$ |

Table 4 illustrates example connectivity constraints generated by the system.

TABLE 4

Connectivity Constraints $D_{I1,O1,1}$
$D_{I1,O5,3}$
$D_{I1,O6,4}$
$D_{I2,O4,2}$
$D_{I3,O3,1}$ For each pair of source-sink nodes (s,t), one of the variables $D_{s,t,d}$ must be true. The example connectivity constraints of Table 9 are unit clauses. It should be appreciated that the connectivity constraints in other examples may be more complex than unit clauses.

For each node n, the system builds network type connectivity constraints denoted as Cond(n) to express that node n can drive the source node s with a delay d only if one of the input nodes m of node n drives node s with a delay equal to d minus the delay of the edge between m and n, which is denoted as delay(m,n). Expression 3 below illustrates a formulation of network connectivity constraints.

$$Cond(s,n)=Ds,n,d \Rightarrow (\vee_{m \in Pred(n)} Ds,m,d-delay(n,m)) \qquad (1)$$

The system is capable of generating the network connectivity constraints illustrated in Table 5 using expression 1.

TABLE 5

| Network connectivity constraints for I1 | Network connectivity constraints for I2 | Network connectivity constraints for I3 |
|---|---|---|
| $\overline{D_{I1,O2,2}} \vee D_{I1,O1,1}$ | $\overline{D_{I2,O1,2}} \vee D_{I2,O2,1}$ | $\overline{D_{I3,O1,2}} \vee D_{I3,O3,1}$ |
| $\overline{D_{I1,O3,2}} \vee D_{I1,O1,1}$ | $\overline{D_{I2,O3,3}} \vee D_{I2,O1,2}$ | $\overline{D_{I3,O2,3}} \vee D_{I3,O1,2}$ |
| $\overline{D_{I1,O4,3}} \vee D_{I1,O2,2}$ | $\overline{D_{I2,O4,2}} \vee D_{I2,O2,1}$ | $\overline{D_{I3,O4,4}} \vee D_{I3,O2,3} \vee D_{I3,O6,3}$ |
| $\overline{D_{I1,O5,3}} \vee D_{I1,O3,2}$ | $\overline{D_{I2,O5,4}} \vee D_{I2,O3,3} \vee D_{I2,O6,3}$ | $\overline{D_{I3,O5,2}} \vee D_{I3,O3,1}$ |
| $\overline{D_{I1,O6,4}} \vee D_{I1,O4,3} \vee D_{I1,O5,3}$ | $\overline{D_{I2,O6,3}} \vee D_{I2,O4,2}$ | $\overline{D_{I3,O6,3}} \vee D_{I3,O5,2}$ |

In one aspect, the system generates an exclusivity constraint Excl(n) for each node n. The exclusivity constraint Excl(n) expresses that node n cannot drive more than one signal of the routing problem. In one aspect, the system is capable of using Expression 2 below to generate a binary clause for each pair of source nodes.

$$Excl(n)=\wedge_{si,sj \in Src(R),di,dj} \overline{Dsi,n,di} \vee \overline{Dsj,n,dj} \qquad (2)$$

Since there are three source nodes in the current example (I1, I2, and I3), the exclusivity constraints can be expressed with three clauses for each node. Table 6 illustrates example exclusivity constraints generated by the system using Expression 2.

TABLE 6

Exclusivity Constraints

| $\overline{D_{I1,O1,1}} \vee \overline{D_{I2,O1,2}}$ | $\overline{D_{I1,O1,1}} \vee \overline{D_{I3,O2,3}}$ | $\overline{D_{I1,O1,1}} \vee \overline{D_{I3,O2,3}}$ |
| $\overline{D_{I1,O2,2}} \vee \overline{D_{I2,O2,1}}$ | $\overline{D_{I1,O2,2}} \vee \overline{D_{I3,O2,3}}$ | $\overline{D_{I2,O2,2}} \vee \overline{D_{I3,O2,3}}$ |
| $\overline{D_{I1,O3,2}} \vee \overline{D_{I2,O3,3}}$ | $\overline{D_{I1,O3,2}} \vee \overline{D_{I3,O3,1}}$ | $\overline{D_{I2,O3,2}} \vee \overline{D_{I3,O3,1}}$ |
| $\overline{D_{I1,O4,3}} \vee \overline{D_{I2,O4,2}}$ | $\overline{D_{I1,O4,3}} \vee \overline{D_{I3,O4,4}}$ | $\overline{D_{I2,O4,3}} \vee \overline{D_{I3,O4,4}}$ |
| $\overline{D_{I1,O5,3}} \vee \overline{D_{I2,O5,4}}$ | $\overline{D_{I1,O5,3}} \vee \overline{D_{I3,O5,2}}$ | $\overline{D_{I2,O5,3}} \vee \overline{D_{I3,O5,2}}$ |
| $\overline{D_{I1,O6,4}} \vee \overline{D_{I3,O6,3}}$ | $\overline{D_{I1,O6,4}} \vee \overline{D_{I3,O6,3}}$ | $\overline{D_{I1,O6,4}} \vee \overline{D_{I3,O6,3}}$ |

During operation, the system also adds the delay exclusive constraints for each node and source to complete the SAT encoding. In this example, since the constraints for only the shortest paths have been encoded, there is only one delay associated with each node and source. This condition implies that these constraints are implicitly satisfied by construction.

In this example, the expression is not satisfiable. There is no way to create a cycle between O5 and O6. The reason is because the source I1 can only go from O5 to O6, but not from O6 to O5 because the delay from I1 to O5 must be exactly 3, which is strictly lower than the delay from I1 to O6, which must be exactly 4 as indicated by the variables $D_{I1,O5,3}$ and $D_{I1,O6,4}$. In accordance with the inventive arrangements described herein, the system returns the critical nodes and constraints that cannot be satisfied.

A conventional SAT router using a conventional SAT encoding is able to satisfy the network connectivity constraints for O5, O6 without building a real path between I1 and O5, O6 due to the inclusion of cycles, which is an illegal routing solution. This is illustrated by the variable assignment of Table 7 determined by a conventional SAT router. The variable assignment of Table 7 satisfies all constraints of a conventional SAT encoding but does not correspond to a legal route.

TABLE 7

Satisfiability Variable Assignments

| | | |
|---|---|---|
| $P_{I1,O1}$ = true | $P_{I2,O1}$ = false | $P_{I3,O1}$ = false |
| $P_{I1,O2}$ = false | $P_{I2,O2}$ = true | $P_{I3,O2}$ = false |
| $P_{I1,O3}$ = false | $P_{I2,O3}$ = false | $P_{I3,O3}$ = true |
| $P_{I1,O4}$ = false | $P_{I2,O4}$ = true | $P_{I3,O4}$ = false |
| $P_{I1,O5}$ = true | $P_{I2,O5}$ = false | $P_{I3,O5}$ = false |
| $P_{I1,O6}$ = true | $P_{I2,O6}$ = false | $P_{I3,O6}$ = false |

Figure 7:
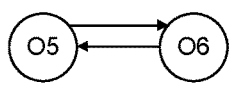
FIG. 7 illustrates a false cyclic routing solution.

FIG. 7 illustrates the routing solution obtained by a conventional SAT router for the routing problem R as described above. FIG. 7 illustrates that node I1 does not drive either of nodes O5 or O6 as the node should. The routing solution is generated by using data structure 210 and only keeping the edges that connect two nodes driven by the same source of the routing problem in the variable assignment of Table 7. For example, the edge (O2, O4) is kept because $P_{I2,O2}$=true and $P_{I2,O4}$=true. Similarly, the edges (O5, O6) and (O6, O5) are kept because the edges are mutually driving themselves with I1 even though there is no path from I1 to O5 and O6.

Figure 8:
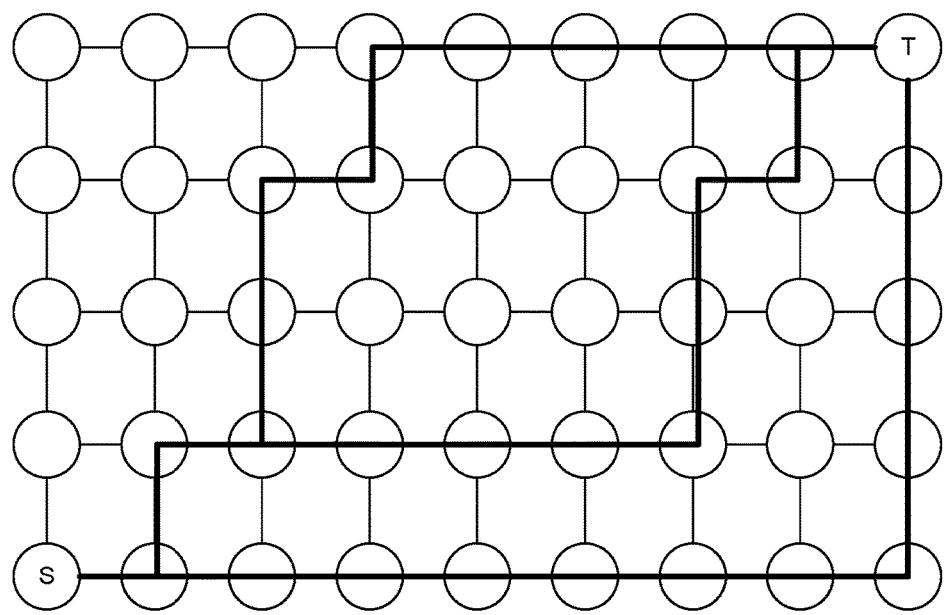
FIG. 8 illustrates examples of shortest paths between a source node and a target node.

FIG. 8 illustrates examples of shortest paths between a source node S and a target node T. More particularly, FIG. 8 illustrates 3 shortest paths between source node S and a target node T. Each of the illustrated paths contains 12 edges. FIG. 8 is provided for purposes of illustration. As can be seen, FIG. 8 has more than the 3 shortest paths (e.g., of 12 edges) between S and T. It can be shown, for example, that the total number of shortest paths between S and T is 495. As discussed, in creating the initial set of candidate paths, the system is capable of selecting one or more or all of the shortest paths for the source sink pair using only 45 Boolean variables, one for each node. In the event a solution is not obtained, the system is capable of adding longer paths, if such paths exist, for each subsequent execution of the SAT solver.

Figure 9:
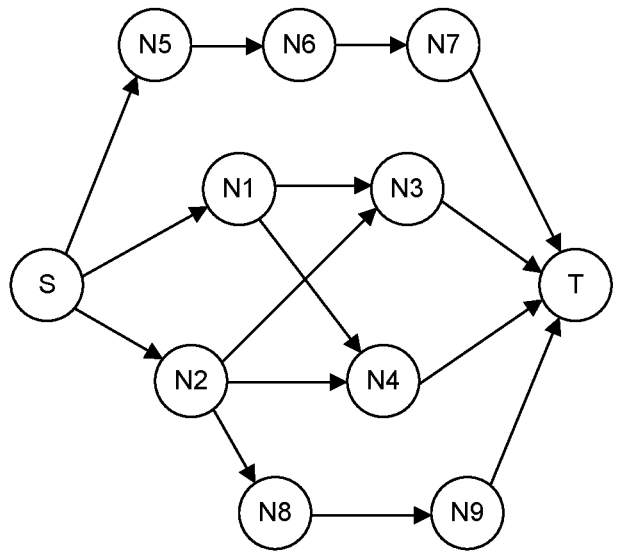
FIG. 9 illustrates a graph data structure with a source and a sink and a list of all paths between the source and the sink.
Figure 9:
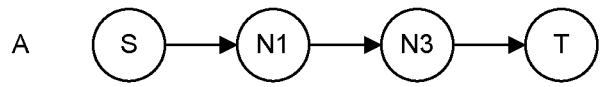
Figure 9:
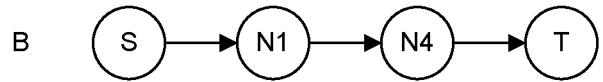
Figure 9:
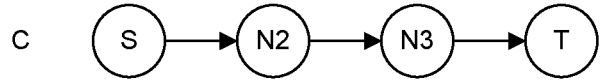
Figure 9:
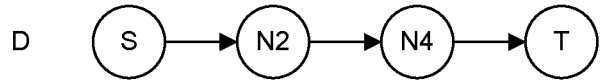
Figure 9:
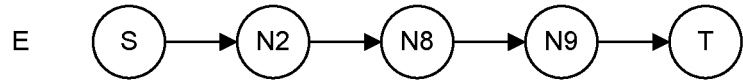
Figure 9:
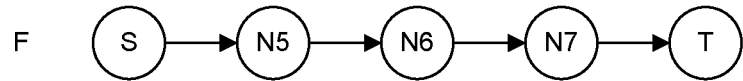

FIG. 9 illustrates a graph data structure with a source S and a sink T and a list of all paths between source S and sink T. FIG. 9 illustrates example paths A, B, C, D, E, and F that may be added to the set of candidate paths in the case where sink T is considered a critical sink. For example, during a first iteration through method 400, the shortest paths A, B, C, and D may be selected as candidate paths for the source-sink pair (S, T). The system can add the paths using the timing-driven SAT encoding by creating the variables $D_{S,N1,1}$, $D_{S,N2,1}$, $D_{S,N3,2}$, $D_{S,N4,2}$, and $D_{S,T,3}$. During a next iteration, the system may add paths E and F to the set of candidate paths for the source-sink pair (S, T) if T is a critical sink. The system can add the paths using the timing-driven SAT encoding, for example, by adding the variables $D_{S,N5,1}$, $D_{S,N6,1}$, $D_{S,N7,3}$, $D_{S,N8,2}$, $D_{S,N9,3}$, and $D_{S,T,4}$. There are now 2 possible delays to go from source S and sink T as indicated by the two variables $D_{S,T,3}$ and $D_{S,T,4}$. Thus, the system adds an exclusive delay constraint to specify that these two variables cannot have both the value True.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory, as described herein, is an example of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

As defined herein, the term "output" means storing in physical memory, e.g., a device, writing to display or other peripheral output device, sending or transmitting to another system, exporting, or the like. As defined herein, the term "plurality" means two or more than two.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a graphics processing unit (GPU), a controller, and so forth.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to methods of routing a circuit design for implementation within an IC. In one aspect, a method can include determining a set of candidate paths from available paths of the IC for connecting source-sink pairs of the circuit design, wherein the set of candidate paths is initially a subset of the available paths, generating, using a processor, an expression having a plurality of variables expressed as a conjunction of routing constraints representing legal routes of the source-sink pairs using only the candidate paths, and determining a routing result for the circuit design by initiating execution of a SAT solver on the expression formula using the processor.

In an aspect, the method can include, in response to the routing result indicating that the expression is not satisfiable, expanding the set of candidate paths, extending the expression using the expanded set of candidate paths, and initiating further execution of the SAT solver on the extended expression.

In another aspect, the set of candidate paths is expanded, the expression is extended using the expanded set of candidate paths, and the SAT solver is executed on the extended expression in response to each unsatisfiable result until a stopping condition is met.

In another aspect, for each execution of the SAT solver, only candidate paths for critical sinks are expanded.

In another aspect, the expression is generated using a path-driven encoding process.

In another aspect, the expression is generated using a timing-driven encoding process.

In another aspect, the variables encode delay values wherein each source and node in a routing solution has a unique delay.

One or more embodiments are directed to systems for routing a circuit design for implementation within an IC. In one aspect, a system includes a processor configured to initiate executable operations. The executable operations include determining a set of candidate paths from available paths of the IC for connecting source-sink pairs of the circuit design, wherein the set of candidate paths is initially a subset of the available paths, generating an expression having a plurality of variables expressed as a conjunction of routing constraints representing legal routes of the source-sink pairs using only the candidate paths, and determining a routing result for the circuit design by initiating execution of a SAT solver on the expression.

In an aspect, the method can include, in response to the routing result indicating that the expression is not satisfiable, expanding the set of candidate paths, extending the expression using the expanded set of candidate paths, and initiating further execution of the SAT solver on the extended expression.

In another aspect, the set of candidate paths is expanded, the expression is extended using the expanded set of candidate paths, and the SAT solver is executed on the extended expression in response to each unsatisfiable result until a stopping condition is met.

In another aspect, for each execution of the SAT solver, only candidate paths for critical sinks are expanded.

In another aspect, the expression is generated using a path-driven encoding process.

In another aspect, the expression is generated using a timing-driven encoding process.

In another aspect, the variables encode delay values wherein each source and node in a routing solution has a unique delay.

One or more embodiments are directed to computer program products for routing a circuit design for implementation within an IC. In one aspect, a computer program product includes a computer readable storage medium having program code stored thereon. The program code is executable by a processor to perform a method including determining a set of candidate paths from available paths of the IC for connecting source-sink pairs of the circuit design, wherein the set of candidate paths is initially a subset of the available paths, generating an expression having a plurality of variables expressed as a conjunction of routing constraints representing legal routes of the source-sink pairs using only the candidate paths, and determining a routing result for the circuit design by initiating execution of a SAT solver on the expression.

In an aspect, the method can include, in response to the routing result indicating that the expression is not satisfiable, expanding the set of candidate paths, extending the expression using the expanded set of candidate paths, and initiating further execution of the SAT solver on the extended expression.

In another aspect, the set of candidate paths is expanded, the expression is extended using the expanded set of candidate paths, and the SAT solver is executed on the extended expression in response to each unsatisfiable result until a stopping condition is met.

In another aspect, for each execution of the SAT solver, only candidate paths for critical sinks are expanded.

In another aspect, the expression is generated using a path-driven encoding process.

In another aspect, the expression is generated using a timing-driven encoding process.

In another aspect, the variables encode delay values wherein each source and node in a routing solution has a unique delay.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of routing a circuit design for implementation within an integrated circuit, the method comprising:
    determining a set of candidate paths from available paths of the integrated circuit for connecting source-sink pairs of the circuit design, wherein the set of candidate paths is initially a subset of the available paths;
    generating, using a processor, an expression having a plurality of variables expressed as a conjunction of routing constraints representing legal routes of the source-sink pairs using only the candidate paths;
    determining, using the processor, a routing result for the circuit design by initiating execution of a SAT solver on the expression; and
    in response to the routing result indicating that the expression is not satisfiable, expanding the set of candidate paths, extending the expression using the expanded set of candidate paths, and initiating further execution of the SAT solver on the extended expression.

2. The method of claim 1, wherein the expanding the set of candidate paths includes adding selected ones of the available paths having a next incrementally longer length to the set of candidate paths.

3. The method of claim 1, wherein the set of candidate paths is expanded, the expression is extended using the expanded set of candidate paths, and the SAT solver is executed on the extended expression in response to each unsatisfiable result until a stopping condition is met.

4. The method of claim 1, wherein, for each execution of the SAT solver, only candidate paths for sinks of the source-sink pairs determined to be critical are expanded.

5. The method of claim 1, wherein the expression is generated using a path-driven encoding process.

6. The method of claim 1, wherein the expression is generated using a timing-driven encoding process.

7. The method of claim 6, wherein the set of candidate paths includes nodes, wherein the variables encode delay values, and wherein each source of a source-sink pair and each node of the set of candidate paths in a routing solution has a unique delay.

8. A system for routing a circuit design for implementation within an integrated circuit, the system comprising:
    a processor configured to initiate executable operations including:
        determining a set of candidate paths from available paths of the integrated circuit for connecting source-sink pairs of the circuit design, wherein the set of candidate paths is initially a subset of the available paths;

generating a expression having a plurality of variables expressed as a conjunction of routing constraints representing legal routes of the source-sink pairs using only the candidate paths;

determining a routing result for the circuit design by initiating execution of a SAT solver on the expression; and in response to the routing result indicating that the expression is not satisfiable, expanding the set of candidate paths, extending the expression using the expanded set of candidate paths, and initiating further execution of the SAT solver on the extended expression.

9. The system of claim 8, wherein the expanding the set of candidate paths includes adding selected ones of the available paths having a next incrementally longer length to the set of candidate paths.

10. The system of claim 8, wherein the set of candidate paths is expanded, the expression is extended using the expanded set of candidate paths, and the SAT solver is executed on the extended expression in response to each unsatisfiable result until a stopping condition is met.

11. The system of claim 8, wherein, for each execution of the SAT solver, only candidate paths for sinks of the source-sink pairs determined to be critical are expanded.

12. The system of claim 8, wherein the processor is configured to generate the expression using a path-driven encoding process.

13. The system of claim 8, wherein the processor is configured to generate the expression using a timing-driven encoding process.

14. The system of claim 13, wherein the set of candidate paths includes nodes, wherein the variables encode delay values, and wherein each source of a source-sink pair and each node of the set of candidate paths in a routing solution has a unique delay.

15. A computer program product comprising a computer readable storage medium having program code stored thereon for routing a circuit design for implementation within an integrated circuit, the program code executable by a processor to perform operations comprising:

determining a set of candidate paths from available paths of the integrated circuit for connecting source-sink pairs of the circuit design, wherein the set of candidate paths is initially a subset of the available paths;

generating an expression having a plurality of variables expressed as a conjunction of routing constraints representing legal routes of the source-sink pairs using only the candidate paths;

determining a routing result for the circuit design by initiating execution of a SAT solver on the expression; and in response to the routing result indicating that the expression is not satisfiable, expanding the set of candidate paths, extending the expression using the expanded set of candidate paths, and initiating further execution of the SAT solver on the extended expression.

16. The computer program product of claim 15, wherein the expanding the set of candidate paths includes adding selected ones of the available paths having a next incrementally longer length to the set of candidate paths.

17. The computer program product of claim 15, wherein the set of candidate paths is expanded, the expression is extended using the expanded set of candidate paths, and the SAT solver is executed on the extended expression in response to each unsatisfiable result until a stopping condition is met.

18. The computer program product of claim 15, wherein, for each execution of the SAT solver, only candidate paths for sinks of the source-sink pairs determined to be critical are expanded.

19. The computer program product of claim 15, wherein the expression is generated using a path-driven encoding process.

20. The computer program product of claim 15, wherein the expression is generated using a timing-driven encoding process.

* * * * *